W. W. ANNABLE.
VEHICLE SPRING.
APPLICATION FILED AUG. 4, 1905.

1,013,855.

Patented Jan. 9, 1912.

Witnesses
Edward R. Monroe
Georgiana Chace

Inventor
Warren W. Annable
By Luther V. Moulton
Attorney

UNITED STATES PATENT OFFICE.

WARREN W. ANNABLE, OF GRAND RAPIDS, MICHIGAN, ASSIGNOR TO ANNABLE PNEUMATIC SPRING COMPANY, OF DETROIT, MICHIGAN, A CORPORATION OF MICHIGAN.

VEHICLE-SPRING.

1,013,855.  Specification of Letters Patent.  Patented Jan. 9, 1912.

Application filed August 4, 1905. Serial No. 272,728.

*To all whom it may concern:*

Be it known that I, WARREN W. ANNABLE, a citizen of the United States, residing at Grand Rapids, in the county of Kent and State of Michigan, have invented certain new and useful Improvements in Vehicle-Springs; and I do hereby declare the following to be a full, clear, and exact description of the invention, such as will enable others skilled in the art to which it appertains to make and use the same.

My invention relates to improvements in vehicle springs, and its object is more particularly to prevent the sudden and objectionable recoil or upward movement of the spring after the same has been suddenly depressed, such movement being very objectionable, especially in vehicles such as automobiles running at high speed over rough roads, the springs of which will often recoil to such an extent as to project the occupants of the vehicle off the seats.

Figure 1:
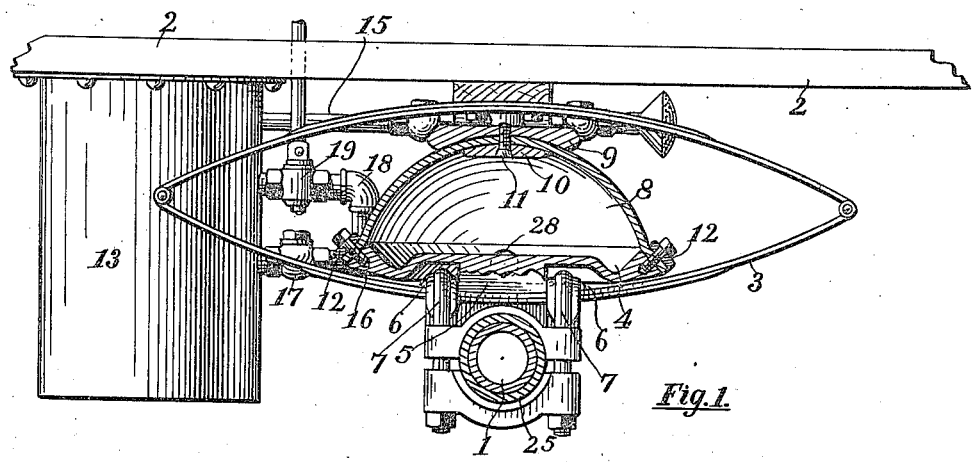
Figure 2:
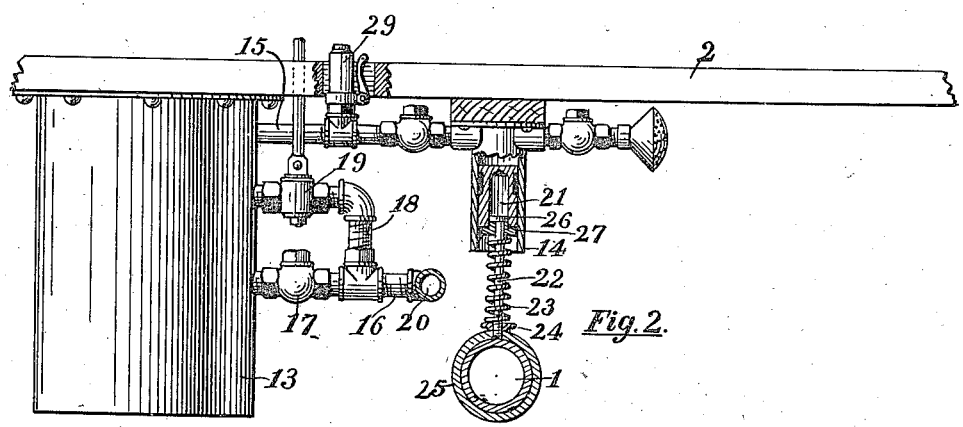
Figure 3:
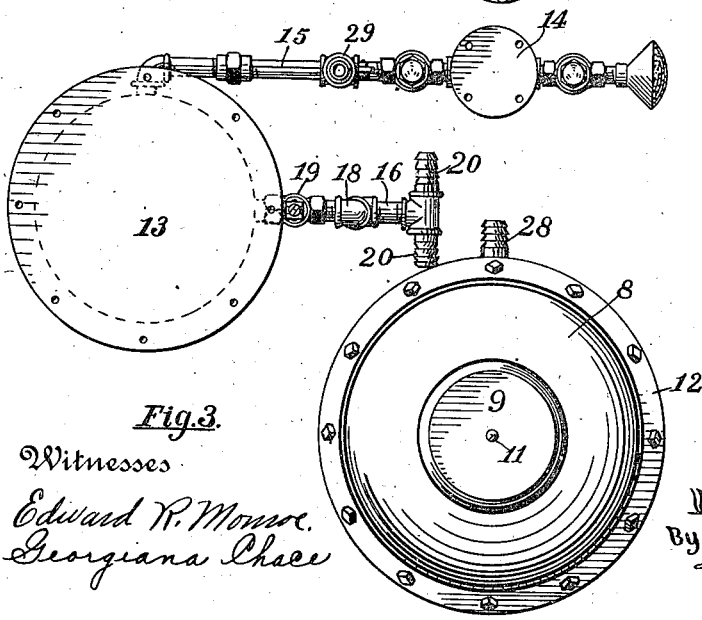

My invention consists of the combination and arrangement of a spring of the usual construction, but of insufficient strength to carry the entire load and a supplementary pneumatic spring connected therewith to receive a portion of the load, together with a tank to receive the compressed air from the pneumatic spring, a check interposed between the spring and tank to prevent the return of the air and a by-pass having an adjustable stop therein whereby the air is slowly returned to the pneumatic spring after the same has been depressed and in the combination and arrangement of parts, as will more fully appear by reference to the accompanying drawings, in which:

Figure 1 is a side elevation of a device embodying my invention with the pneumatic spring in vertical section; Fig. 2, the same with the springs removed showing the tank, air pump, and pipe connections, with the pump in vertical section; and Fig. 3, a plan view of the device as shown in Figs. 1 and 2.

Like numbers refer to like parts in all of the figures.

1 represents the axle of a vehicle, or other support for the springs; 2 represents a portion of the body of the vehicle, or the support for the same; 3 represents an elliptical spring of the usual form, but of less strength than required to carry the load; 4 represents the bed plate of a pneumatic spring or cushion secured by a neck 5 and lugs 6 to the lower part of the spring 3 by means of the clips 7, which clips also hold the spring 3 in place; 8 represents a semi-globular, hollow, elastic body or cushion, preferably of rubber, upon which is supported a bed plate 9 secured thereto by an inner plate 10 and screw 11, this bed plate being thus adapted to engage and yieldingly support the upper part of the spring 3. The lower rim of this cushion 8 is secured to the rim of the bed plate 4 by means of a ring 12 and cap screws, thus forming an air tight elastic body.

Extending from the bed plate and with an opening therethrough is a hose nipple 28 to which a hose (not shown) is attached and extended to a corresponding hose nipple 20 connected to a tank 13 by means of a pipe 16. In this pipe is a check valve 17 to prevent return of the air from the tank 13; 18 is a by-pass connecting the pipe 16 with the interior of the tank, and in this by-pass is an adjustable stop-cock 19 whereby the air is permitted to flow more or less freely from the tank to the pneumatic spring.

To supply air under pressure to the tank, and to regulate the pressure thereof, an air pump 14 is attached to the body 2 and provided with a piston having an axial opening 21 in which opening is longitudinally movable the head 26 of a rod 22, the lower end of said rod being connected to the axle casing 25 or other portion of the spring support. A removable plug 27 limits the downward movement of the head 26 in the opening 21 and slides freely on the rod 22. A spring 23 surrounds the rod 22 and yieldingly supports the piston at its upper end and at its lower end is supported upon a vertically adjustable nut 24 on the rod 22. This pump is connected to the tank 13 by a pipe 15 and interposed in the pipe is an ordinary safety-valve 29 set to blow off at the maximum pressure desired and provided with the usual lever whereby the pressure may be reduced at any time by blowing off the air through this safety valve.

In operation the vertical movement of the body 2 in relation to the axle or spring support will move the pump downward relative to the piston therein, and thus operate the pump. The spring 23 is adjusted by means of the nut 24 and the pressure determined in the tank to various loads as follows: When the pressure reaches the predetermined limit, the resistance of such pressure upon the piston will compress the spring instead of forcing more air into the tank. So also in the event of any excessive downward movement of the body, the spring will be compressed after the piston has reached the bottom of the pump and thus any breakage is prevented.

I have shown two hose nipples 20 adapting the device to a single pair of springs. It is obvious, however, that additional nipples may be provided for any greater number of springs, as occasion may arise.

Having thus fully described my invention what I claim and desire to secure by Letters Patent is:

1. In combination with a vehicle, an air tank and pump mounted on the body of the vehicle, a rod connecting the spring support and the piston and movable longitudinally of the piston, and a spring engaging the piston to operate the same.

2. In combination with a vehicle, a pneumatic spring, a pump to supply compressed air to the spring and mounted on the body of the vehicle, a rod movably connected to the pump piston at one end and attached to the spring support at the other end, and a spring yieldingly engaging the piston to operate the same.

3. In combination with a vehicle, a pneumatic spring, a pump to supply compressed air to the spring and mounted on the vehicle body, a rod movably connected to the piston, a spring engaging the piston at one end, and an adjustable support for the other end of the spring.

4. In combination with a vehicle, a pneumatic spring, a pump to supply compressed air to the spring and mounted on the vehicle body, a piston for the pump and having a longitudinal opening, a rod having a head at one end movable in said opening, said rod being attached at the other end to the spring support of the vehicle, a spring on the rod and engaging the piston, and an adjustable nut on the rod to support the spring.

5. In a vehicle, a pneumatic spring, an air pump connected to the spring and mounted on the vehicle body, a piston having an axial opening, a removable plug to close the opening, a rod extending through the plug and having a head at one end and traversing the opening, said rod being attached at the other end to the spring support of the vehicle, a spring on the rod and engaging the plug at one end, and an adjustable nut on the rod to support and adjust the spring.

6. In a vehicle, an elliptical spring mounted on the axle and supporting the body of the vehicle, a pneumatic spring within the elliptical spring, an air tank connected to the pneumatic spring, a check-valve between the tank and pneumatic spring, a by-pass around the check-valve, an air pump mounted on the vehicle body and connected to the tank, a rod movably connected to the piston of the pump at one end and rigidly connected to the axle of the vehicle at the other end, and a spring between the axle and piston.

7. In a vehicle, the combination of an elliptic spring between the axle and body and of insufficient strength to carry the load, a pneumatic spring auxiliary to the elliptic spring, an air tank connected to the pneumatic spring, a check-valve between said tank and spring, a by-pass around said check-valve, an adjustable stop in the by-pass, an air pump connected to the tank and mounted on the vehicle body, a rod movably connected to the pump piston and rigidly connected to the spring support of the vehicle, a spring engaging the piston at one end, and an adjustable support engaging the other end of the spring.

In testimony whereof I affix my signature in presence of two witnesses.

WARREN W. ANNABLE.

Witnesses:
LUTHER V. MOULTON,
GEORGIANA CHACE.